US010099114B2

(12) United States Patent
Rogers et al.

(10) Patent No.: US 10,099,114 B2
(45) Date of Patent: Oct. 16, 2018

(54) METHOD AND SYSTEM TO CONDUCT A BONUS GAME THAT LINKS SEPARATE PRIMARY LOTTERY GAMES

(71) Applicant: Scientific Games International, Inc., Newark, DE (US)

(72) Inventors: Kyle Rogers, Cumming, GA (US); Steve Saferin, Atlanta, GA (US); Victor Marinelli, Canton, GA (US)

(73) Assignee: Scientific Games International, Inc., Newark, DE (US)

( * ) Notice: Subject to any disclaimer, the term of this patent is extended or adjusted under 35 U.S.C. 154(b) by 386 days.

(21) Appl. No.: 14/880,574

(22) Filed: Oct. 12, 2015

(65) Prior Publication Data

US 2016/0101352 A1 Apr. 14, 2016

Related U.S. Application Data

(60) Provisional application No. 62/062,177, filed on Oct. 10, 2014.

(51) Int. Cl.

*G07F 17/00* (2006.01)
*G07F 19/00* (2006.01)
*A63F 9/24* (2006.01)
*A63F 13/00* (2014.01)

(Continued)

(52) U.S. Cl.

CPC .......... *A63F 3/0605* (2013.01); *G07F 17/329* (2013.01); *G07F 17/3258* (2013.01); *A63F 2250/64* (2013.01)

(58) Field of Classification Search

CPC ............... A63F 3/0605; G07F 717/329; G07F 717/3267

See application file for complete search history.

(56) References Cited

U.S. PATENT DOCUMENTS 6,616,531 B1 * 9/2003 Mullins .............. A63F 3/00157 273/269
6,749,198 B2 6/2004 Katz et al.
2002/0037766 A1 3/2002 Muniz
2003/0190943 A1 * 10/2003 Walker .................... G07F 17/32 463/17

(Continued)

OTHER PUBLICATIONS

PCT Search Report and Written Opinion, dated Dec. 11, 2015.

*Primary Examiner* — Milap Shah
(74) *Attorney, Agent, or Firm* — Dority & Manning, P.A.

(57) ABSTRACT

A system and related methods for conducting a bonus game to a first primary game that enhances sales of tickets in an unrelated second primary game includes establishing the first primary game wherein players are issued first game tickets for play of the first primary game. A bonus game is established that is played separate from the first primary game. To qualify for entry into the bonus game, players enter at least one first game ticket from the first primary game. A second primary game is established wherein players are issued second game tickets that are linked to the bonus game for the first primary game such that players enhance the prize awarded in the bonus game by entering the second game tickets into the bonus game. Play of the first primary game does not require play of the bonus game or the second primary game. Play of the second primary game does not require play of the first primary game or the bonus game. Play of the bonus game requires play of the first primary game but not the second primary game.

10 Claims, 6 Drawing Sheets

(51) Int. Cl.
*A63F 3/06* (2006.01)
*G07F 17/32* (2006.01)

(56) References Cited

U.S. PATENT DOCUMENTS

| | | | | |
|---|---|---|---|---|
| 2004/0176158 | A1* | 9/2004 | Baldwin | G07F 17/32 463/17 |
| 2004/0209665 | A1 | 10/2004 | Walker et al. | |
| 2005/0149393 | A1* | 7/2005 | Leof | G06Q 30/02 705/14.12 |
| 2005/0194735 | A1* | 9/2005 | Mirandette | A63F 3/065 273/138.1 |
| 2005/0250571 | A1 | 11/2005 | Kane et al. | |
| 2007/0129144 | A1* | 6/2007 | Katz | G07F 17/32 463/30 |
| 2008/0220840 | A1* | 9/2008 | Katz | G07F 17/32 463/16 |
| 2009/0117966 | A1* | 5/2009 | Rogers | G07C 15/005 463/17 |
| 2011/0059786 | A1 | 3/2011 | Walker et al. | |
| 2013/0324207 | A1* | 12/2013 | Stanek | G07F 17/3232 463/17 |
| 2014/0295932 | A1* | 10/2014 | Irwin, Jr. | G07F 17/329 463/17 |
| 2016/0101348 | A1* | 4/2016 | Rogers | A63F 3/0605 463/17 |
| 2016/0101349 | A1* | 4/2016 | Saferin | A63F 3/0605 463/17 |
| 2016/0101350 | A1* | 4/2016 | Rogers | A63F 3/0605 463/17 |
| 2016/0101351 | A1* | 4/2016 | Rogers | A63F 3/0605 463/17 |

* cited by examiner

METHOD AND SYSTEM TO CONDUCT A BONUS GAME THAT LINKS SEPARATE PRIMARY LOTTERY GAMES

PRIORITY CLAIM

The present application claims priority to U.S. Provisional Patent Application Ser. No. 62/062,177, filed Oct. 10, 2014.

FIELD OF THE INVENTION

The present invention relates to conducting second chance game events (e.g., bonus games) associated with separate and independent primary lottery.

BACKGROUND

Lottery games have become a time honored method of raising revenue for state and federal governments the world over. Traditional scratch-off and draw games have evolved over decades, supplying increasing revenue year after year. However, after decades of growth, the sales curves associated with traditional games seem to be flattening out. Consequently, both lotteries and their service providers are presently searching for new methods of increasing sales.

In one attempt to increase sales, United States lotteries have adopted second chance games where the consumer can enter losing lottery ticket codes on lottery Internet sites to play instant second chance games (also referred to as "bonus games") or to enter second chance drawings. However, for the most part, second chance games usually involve prizes of a minor nature compared to the main lottery games and, although having some impact, are generally not recognized as a significant promoter of sales of the primary game.

In an attempt to increase participation in the primary games, certain state jurisdictions in the United States have implemented "players' clubs" wherein participants register loosing primary tickets from multiple primary games into an online player account. The losing tickets are treated as entries into periodic drawings for secondary prizes. For example, Georgia sponsors a "PLAYERS CLUB" program wherein registered participants enter non-winning Georgia Lottery instant tickets via an online account into a second chance drawing program. Monthly drawings are conducted for an array of different awards, such as a monthly grand cash prize, featured prizes, and "points" awards that may be redeemed at a number of participating sponsors.

The second chance games discussed above may be improved upon to further generate sales of tickets in the primary lottery games.

SUMMARY OF THE INVENTION

Objects and advantages of the invention will be set forth in part in the following description, or may be obvious from the description, or may be learned through practice of the invention.

In accordance with aspects of the invention, a computer-implemented method is provided for conducting a bonus game to a first primary game that enhances sales of tickets in an unrelated second primary game. The primary games may be different types of respective lottery games sponsored by governmental entity, such as a state or multi-state organization. It should be appreciated, however, that the invention is not limited to lottery games per se, but is applicable to any gaming scenario wherein separate and independently run primary games are implemented through the sale of respective tickets, vouchers, individual plays, and so forth.

The primary game is established wherein players are issued first game tickets for play of the first primary game. A bonus game is established that is played separate from the first primary game with its own set of rules and prize structure. To qualify for entry into the bonus game, players enter at least one first game ticket from the first primary game, which may be a winning or non-winning ticket in the first primary game. A second primary game is established wherein players are issued second game tickets for play of the second primary game. The second game tickets are linked to the bonus game for the first primary game such that players enhance a prize awarded in the bonus game (e.g., increased odds of winning or increased amount of prize awarded) by entering second game tickets (winning or non-winning) into the bonus game. The primary games and bonus game are conducted such that (i) play of the first primary game does not require play of the bonus game or the second primary game, (ii) play of the second primary game does not require play of the first primary game or the bonus game, and (iii) play of the bonus game requires play of the first primary game but not the second primary game.

In a particular embodiment, first bonus game symbols are associated with the first game tickets, for example by being printed on the game tickets. In another embodiment, the game tickets may provide instructions to the player as to how to acquire a unique associated bonus game symbol via a website. The players are required to collect a predefined set or grouping of different ones of the first bonus game symbols to qualify for entry into the bonus game. The game method is not limited to any particular grouping technique or scheme. For example, sets may be defined by color, theme, number, location on a board or matrix, and so forth, so long as the sets are readily understood and identified to the players.

A second different type of bonus game symbol is associated with (e.g., printed on or accessible via a website) the second game tickets that is visually linked to a particular one of the predefined sets of first bonus symbols. The player's initial entry into the bonus game (granted upon accumulation of a particular predefined set of first bonus game symbols) is enhanced by one or more of the second bonus game symbols the player has accumulated that are linked to the respective predefined set of first bonus game symbols. For example, the bonus game may be a drawing event wherein the player is awarded a defined number of initial entries (e.g., one or more tickets) in the drawing upon accumulation of one of the predefined sets of first bonus game symbols. The number of initial entries may be increased by multiplying the number as a function of one or more of the second bonus game symbols the player has accumulated that are linked or associated with the respective predefined set of first bonus game symbols.

It should be appreciated that the bonus or second chance game is not limited to drawings. In the event that the bonus game is conducted as a drawing-type of game, the bonus games may be conducted on a scheduled periodic basis such that players become eligible for a next scheduled bonus game upon acquiring the predefined set of first bonus game symbols prior to the scheduled date of the bonus game.

In certain embodiments, the players are provided with a bonus game board that tracks first bonus game symbols and second bonus game symbols acquired by the player. This game board may be a virtual board that automatically updates and visually associates the second bonus game symbols with their respective predefined set of first bonus game symbols. For example, in the bonus game board may have a MONOPOLY game theme, wherein the first bonus game symbols identify property locations on the MONOPOLY game board, such as the widely-recognized "blue" properties "Boardwalk" and "Park Place." The second bonus game symbols associated with the second lottery tickets may equate to a house or hotel structure built on one of the property locations, such as "one hotel on Boardwalk" or "two houses on Park Place." As with the conventional MONOPOLY game, a greater number of house or hotel structures associated with the property increases or enhances the location's value. For example, the structures may increases the number of entries into the bonus game once the predefined set of property locations is satisfied by the player. For example, the player may be awarded ten initial entries into the bonus game for accumulating Park Place and Boardwalk from the first primary lottery game. If the player has also accumulated two houses on Boardwalk, the initial number of entries may be multiplied by a factor of three to grant the player thirty entries into the bonus game.

In a desirable embodiment, the bonus game is conducted via a website that is made accessible by players and the bonus game board is a virtual game board provided to the players via the website. For example, individual players may establish bonus game accounts via the website, wherein each player is shown their own individualized game board that updated with a status of the first bonus game symbols and second bonus game symbols accumulated by the player.

It should be appreciated that the present game method is not limited to any particular type of first and second primary games. In one embodiment, the first primary game is a lottery draw game (e.g., a "Pick-4" game wherein players attempt to match selected player indicia with four indicia randomly drawn from a field of indicia) and the first game tickets are lottery draw tickets having at least one entry into the draw game. These tickets may be purchased by players at an authorized lottery retail establishment, via the Internet, and so forth. The first lottery tickets have one or more of the first bonus game symbols provided thereon (or associated therewith), such as an Ace-of-spades where the first game symbols are divided into groups of playing cards and the players are required to collect a predefined set of cards for initial entry into the bonus game.

The second primary game may also be a lottery game, including another independently conducted draw game with its own prize structure. In a particular embodiment, however, the second primary game is an instant ticket lottery game and the second game tickets are instant lottery tickets having a second bonus game symbol provided thereon that is visually linked to a particular one of the predefined sets of first bonus symbols. For example, the bonus symbol may be a "3× multiplier for ♠", wherein a player's initial entry into the bonus game with a particular predefined set of spades is enhanced by a factor of three (e.g., an initial 10 entries becomes 30 entries).

The present invention also encompasses a game system that embodies many of the methodology aspects discussed above so as to increase the sales of unrelated primary games and potentially enhance winnings in a bonus or second chance game. For example, such a game system includes a first game entered by a purchase of a first game entry, each purchased first game entry providing a randomly assigned indicia corresponding to at least one of a plurality of indicia contained on a common game board. The first game may be a first lottery game, such as a draw game or instant ticket game, and the first game entries may be winning or non-winning tickets from the first lottery game. The game board may be a physical board, such as a substrate having a game board printed thereon, or a virtual game board provided via a website made accessible to by the players. The plurality of indicia on the common game board are divided into predefined sets or groupings, for example groupings of playing cards by suits, colors, numbers, themes, game themes (e.g., MONOPOLY properties), and so forth. The game includes a second game entered by purchase of a second game entry that includes a prize enhancement applicable to at least one of the predefined groupings of indicia on the common game board, wherein the potential prize enhancement is awarded upon collection in the first game of all indicia in the respective predefined grouping of indicia. The second game may be a second lottery game, such as a draw game or instant ticket game.

The first and second games comprise standalone separately playable games with separate and independent prize structures, wherein the games may be played completely independent of each other.

As discussed above, the prize enhancement on the second game entries may be a game symbol that is visually linked to a particular one of the predefined groupings of indicia. Other aspects discussed above are also applicable to various embodiments of the game system. For example, the common game board may be a component of a bonus draw game wherein players are awarded a defined number of entries in the draw game once the player has accumulated the predefined grouping of indicia, the number of entries in the draw game multiplied as a function of the game symbol on the second game entry.

In a desirable embodiment, the common game board tracks indicia and game symbols accumulated by the player, including visually associating the bonus game symbols with their respective predefined groupings of indicia.

BRIEF DESCRIPTION OF THE DRAWINGS

A full and enabling description of the present invention is provided herein, with reference to particular embodiments depicted in the attached drawings and described below. Certain of the drawings and related description include depictions or reference to characters, images, trademarks, logos, and the like, associated with the well-known board game MONOPOLY. "MONOPOLY" and the related graphics in the drawings (including all names, characters, images, trademarks and logos) are protected by trademark, copyrights, and other Intellectual Property rights owned by Hasbro.

DETAILED DESCRIPTION

Figure 1:
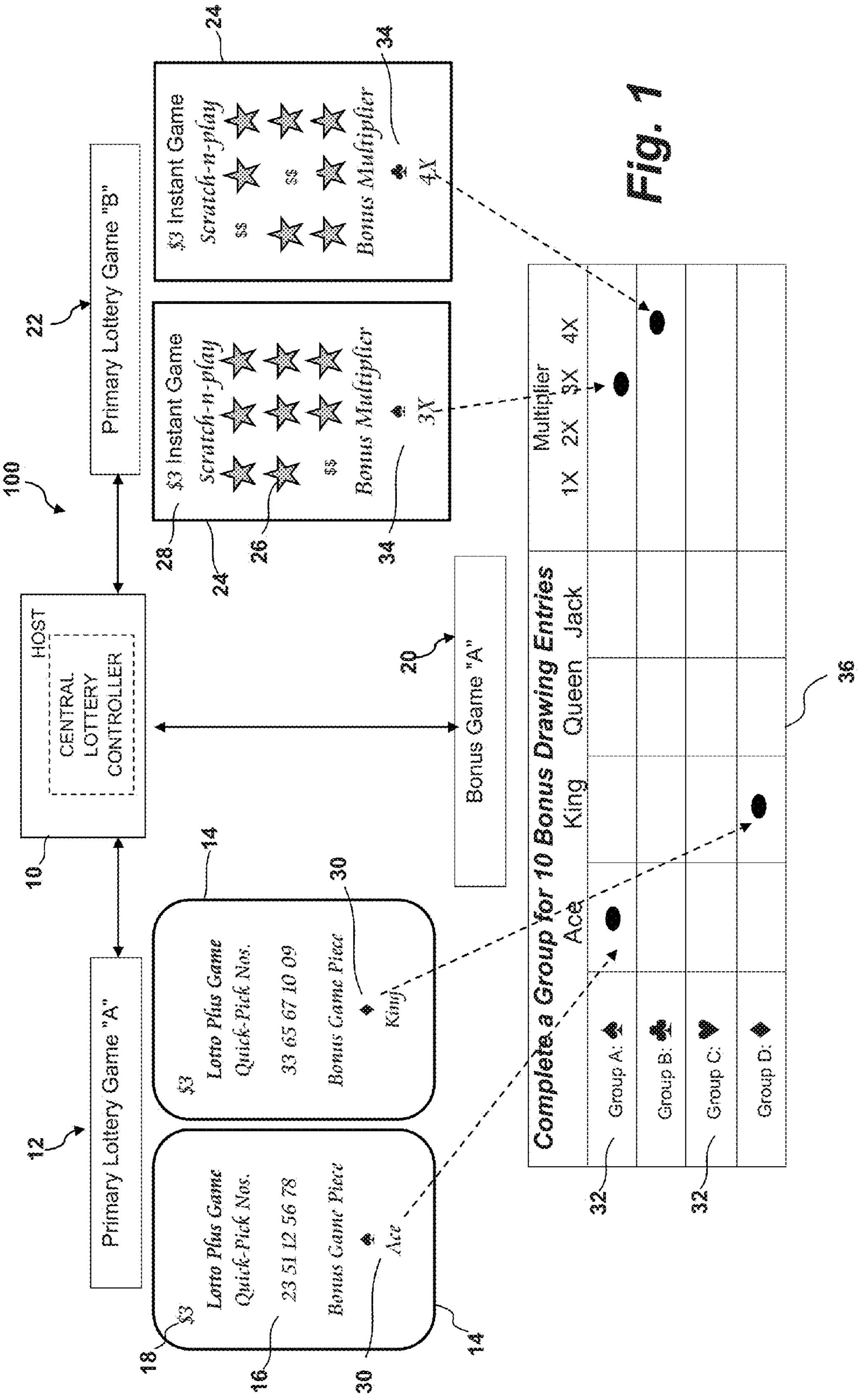
FIG. 1 is a diagram illustration of a system and method for primary games, such as primary lottery games, linked by a bonus game.

Reference will now be made in detail to embodiments of the inventive methods and systems, one or more examples of which are illustrated in the drawings. Each embodiment is presented by way of explanation of the invention, and not as a limitation of the invention. For example, features illustrated or described as part of one embodiment may be used with another embodiment to yield still a further embodiment. It is intended that the present invention include these and other modifications and variations as come within the scope and spirit of the invention.

In general, the present disclosure is directed to computer implemented methods and systems for conducting a second chance or bonus game program that links multiple primary games, thereby potentially increasing sales in the primary games to enhance one's chances of success in the bonus game. For sake of example only, the following discussion relates to embodiments of the invention drawn to primary lottery games sponsored by state or other jurisdictional authorities. It should be appreciated, however, that the system and method are just as applicable to a second chance game program linked to any manner of primary games, such as multiple primary games conducted within a gaming establishment (e.g., a casino) for patrons of such establishment.

As their name implies, second chance games or drawings are a means for a game player to win a prize with an apparent losing ticket from an initial or primary game. Traditionally, these second chance tickets are from non-winning instant (scratch-off) game tickets. Certain embodiments described herein are a means to link such instant game tickets to a second chance game that is implemented or entered through a completely different primary game, which may be another type of instant scratch-off game or a conventional draw game. It should be appreciated that the present method and system are not limited to only non-winning tickets in the primary games.

Referring to FIG. 1, a game method and associated implementing system 100 are illustrated. The method and system are hosted by a gaming or lottery authority through a host controller 10, which may be any hardware/software architecture necessary for conducting the games in a given jurisdictional area. A first primary game 12 is depicted as a lottery draw game wherein players are issued first game tickets or entries 14 in the form of lottery tickets for play of the lottery draw game in a conventional manner. For example, the lottery tickets 14 include any manner of game indicia 16, 18 for play of the draw game, including price of the ticket, the player's game numbers, bar codes, security features, and the like. The type or manner of game indicia is not limiting factor of the invention and includes any indicia necessary or desired to conduct the first primary game 12.

A bonus game 20 is established that is played separate from the first primary game 12. The bonus game 20 has its own set of rules and prize structure and is generally conducted completely independent of the primary lottery game. Various types of second chance or bonus games 20 are well known in the lottery industry, and any one or combination of these games may be utilized in the present invention. In the embodiment depicted in FIG. 1, the bonus game 20 is referenced as a "drawing" type of game (i.e., a raffle). Players are granted entries or tickets into a random drawing wherein winning selections are drawn from the pool of entries. To qualify for entry into the bonus game 20, players enter at least one first game ticket 14 from the first primary game 12, which may be a winning or non-winning ticket in the first primary game 12. The ticket is "entered" in the sense that each game ticket or entry 14 is uniquely identified by a code or other means that the player provides to the game authority or administrator, for example via a website maintained by the game authority or in person at an authorized game or lottery location. Once verified, the ticket 14 is entered into the bonus game 20, which may be conducted as described herein.

A second primary game 22 is established wherein players are issued second game tickets or entries 24 for play of the second primary game. In the embodiment depicted in FIG. 1, the second primary game 22 is a conventional instant scratch-off lottery game wherein players are issued second game tickets 24 in the form of conventional scratch-off lottery tickets having any manner of game indicia 26, 28 for play of the instant games, including price of the ticket, game symbols underlying a scratch-off coating, bar codes, security features, and the like. Conventional lottery scratch-off tickets are well known in the art and need not be described in detail herein.

The second game tickets 24 are "linked" to the bonus game 20 for the first primary game 22 such that players increase their chance of success in the bonus game 20 by entering the second game tickets 24 (winning or non-winning) into the bonus game 20. The primary games 12, 22 and bonus game 20 are conducted such that (i) play of the first primary game 12 does not require play of the bonus game 20 or the second primary game 22, (ii) play of the second primary game 22 does not require play of the first primary game 12 or the bonus game 20, and (iii) play of the bonus game 20 requires play of the first primary game 12 but not the second primary game 22. Thus, the gate to the bonus game 20 is play of the first primary game 12. The player cannot enter the bonus game 20 simply by playing the second primary game 22. Play of the second primary game 22 may, however, increases the player's likelihood of success or enhance a prize in the bonus game 20 by various means. For example, in one embodiment described in greater detail below, entry of game tickets 24 from the second primary game 22 may increase the number entries a player is granted in the bonus draw game 20, or increase a prize awarded in the bonus game 20, or increase the number of bonus games 20 the player is eligible to play, and so forth.

Still referring to the embodiment of FIG. 1, first bonus game symbols 30 are associated with the first game tickets 14, for example by being printed on the game tickets as depicted in FIG. 1. In another embodiment, the game tickets 14 may provide instructions to the player as to how to acquire a unique associated bonus game symbol 30 that is revealed to the player via a website. The players are required to collect a predefined set or grouping (the terms "sets" and "groups" are used interchangeably herein) of different ones of the first bonus game symbols 30 before being granted entries into the bonus game 20. A predefined set includes a set of one game symbol 30 or a set of a plurality of game symbols 30. As mentioned, the method is not limited to any particular grouping technique or scheme. For example, sets may be defined by color, theme, number, location on a board or matrix, and so forth, so long as the sets are readily understood and identified to the players. In the embodiment of FIG. 1, the predefined sets 32 are face cards from a conventional playing deck. Group A corresponds to: A♠, K♠, Q♠, and J♠. Group B corresponds to: A♣, K♣, Q♣, and J♣. Group C corresponds to: A♥, K♥, Q♥, and J♥. Group D corresponds to: A♦, K♦, Q♦, and J♦. In the embodiment of FIG. 1, in order to qualify for play of the bonus game 20, a player would need to satisfy any one of these groups with the game symbols 30 they have accumulated from purchase of first game tickets 14.

The game symbols 30 on the first game tickets 14 are the A♠ and K♦, respectively. It should be appreciated that the game symbols 30 could be cards or items that are not within any of the predefined groups 32. For example, the game symbols 30 on game tickets 14 may be 10♠ or 8♣, which are not face cards belonging to any one of the predefined groups 32 and thus have no value in the bonus game 20.

If the one of the groups 32 are satisfied by the player's accumulation of game symbols 30, then the player qualifies to play the bonus game 20 and is granted a defined number of entries into the bonus game drawing. For example, in the embodiment of FIG. 1, the player is granted 10 entries into the bonus game drawing 20 for each group 32 collected by the player.

A second type of bonus game symbol 34 is associated with (e.g., printed on or accessible via a website) on the second game tickets 24. The second bonus game symbols 34 are visually linked to a particular one of the predefined groupings 32 of first bonus symbols to the extent that a player can readily visually associate the symbol 34 with a particular group 32. For example, referring to the embodiment of FIG. 1, the second bonus game symbols 34 printed on the second game tickets 24 are "♠3×" and "♣4×", respectively. A player can readily appreciate that "♠3×" is a multiplier (factor of 3) associated with the Group A, and that "♣4×" is a multiplier (factor of 4) associated with Group B.

The player's initial entry into the bonus game 20 (granted upon accumulation of one or more of the predefined sets 32 of first bonus game symbols) is enhanced by one or more of the second bonus game symbols 34 the player has accumulated that are linked to the respective predefined set 32 of first bonus game symbols 30. For example, referring to FIG. 1, the bonus game 20 is a drawing event wherein a "winner" is randomly selected from a pool of entries, the winner receiving a prize award of some value. The player is granted 10 initial entries into the drawing upon accumulation of one of the predefined sets 32 of first bonus game symbols 30. The player has also accumulated a 3× multiplier for Group A and a 4× multiplier for Group B. If the player satisfies Group A, then the 10 initial entries are increased to 30. If the player satisfies Group B, then the 10 initial entries are increased to 40.

In certain embodiments, the player can accumulate multiple sets 32 between bonus games, wherein the player's number of entries in the next scheduled bonus game 20 is the cumulative total from all of the accumulated sets. For example, if the player accumulates Group A and Group B, then he is granted 20 initial entries in the bonus game 20. These initial entries may be increased by any second bonus game symbols 34 acquired by the player that relate to Group A or Group B.

The embodiment of a multiplier that increases the player's odds of winning is only one example of an enhancement to play of the bonus game 20. In another embodiment, the second bonus game symbol 34 may increase the prize award in the bonus game 20. For example, a multiplier of 3× may apply to an initial prize award of $100 in the bonus game 20 to increase the prize to $300. In still another embodiment, the second bonus game symbol 34 may identify an "add-on" prize that is in addition to the bonus game price, such as a $500 shopping spree, and so forth. It should be appreciated that the type of enhancement provided by the second bonus game symbols 34 can vary within the scope and spirit of the invention.

Figure 2:
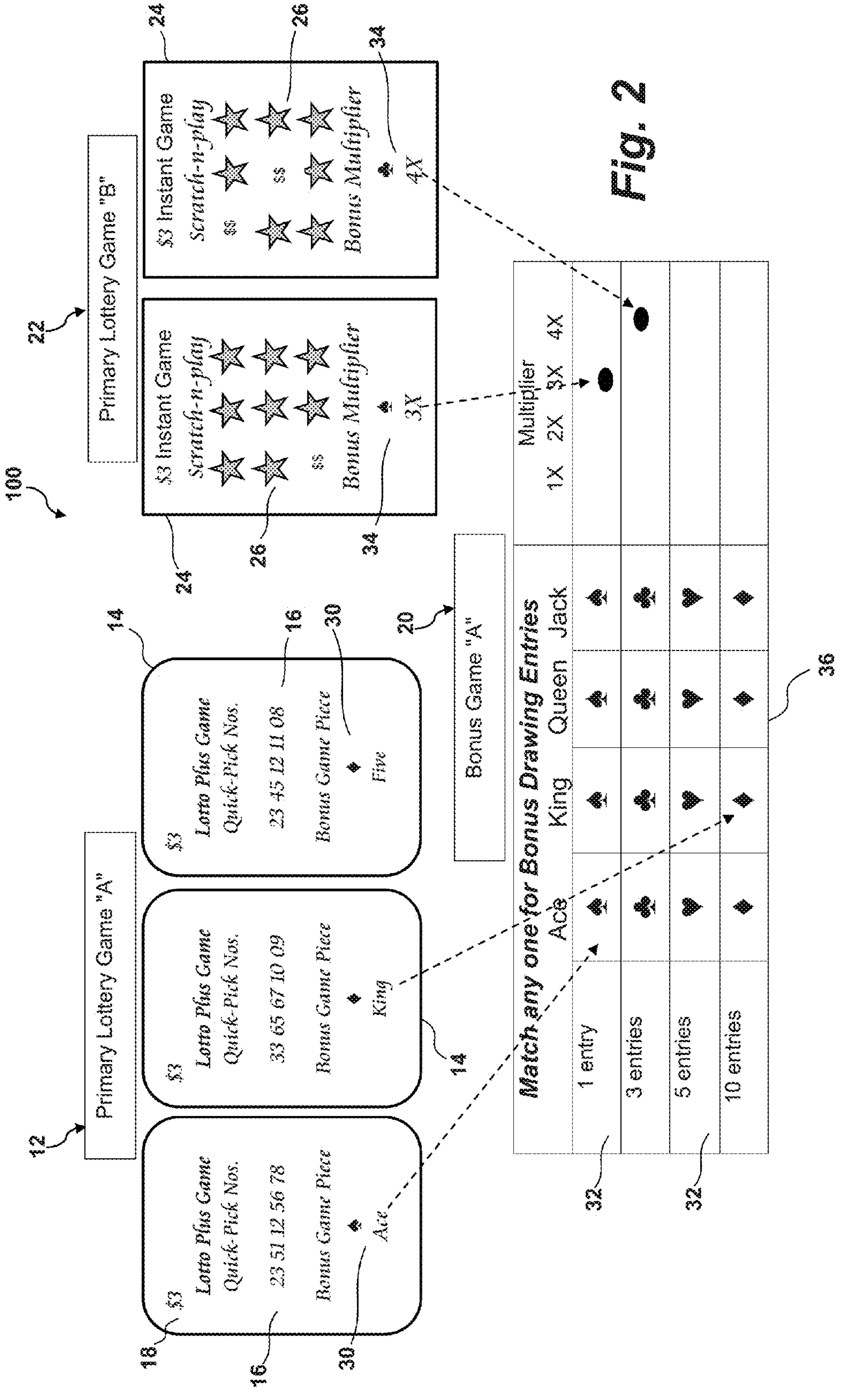
FIG. 2 is a diagram illustration of an alternative embodiment of system and method in accordance with aspects of the invention.

FIG. 2 depicts and embodiment 100 of a method and associated system that is similar in many respects to the embodiment of FIG. 1. In this embodiment, however, qualification for entry into the bonus game 20 only requires one particular bonus game symbol 30. In other words, the predefined sets 32 include one or more game symbols 30. For example, the player has accumulated three first game symbols 30 from the first primary lottery game 12: ♠A, ♦K, and ♦5. The ♠A entitles the player to 1 entry in the bonus game 20, and the ♦K entitles the player to 10 entries in the bonus game. The ♦5 does not match one of the predefined sets 32 and has no value in the bonus game 20. As with the embodiment of FIG. 1, the player can accumulate multiple sets 32 between bonus games, wherein the player's entries in the next scheduled bonus game 20 is the cumulative total from all of the accumulated sets.

In certain embodiments, the players are provided with a bonus game board 36 that tracks the first bonus game symbols 30 and second bonus game symbols 34 acquired by the player. In the embodiment of FIG. 1, the game board 36 is a tabular compilation wherein positions in the table are marked or highlighted with the player's accumulated symbols, as indicated by the arrows in FIG. 1. It should be appreciated that any manner or configuration of game board 36 may be designed based on the type of primary and secondary games 12, 22, and bonus game 20. The game board 36 may be a virtual board accessed by the player via a website that automatically updates and visually associates the second bonus game symbols 34 with their respective predefined set 32 of first bonus game symbols 30, as in FIG. 1. For example, individual players may establish a respective bonus game account via the website, wherein each player is shown their own individualized game board 36 that is updated with a status of the first bonus game symbols 30 and second bonus game symbols 34 accumulated by the player. In an alternate embodiment, players may be provided with a "hard" game board (e.g. printed on paper or card stock) or "electronic" game board (e.g., application of a wireless device) that the player updates as the games progress.

Figure 3A:
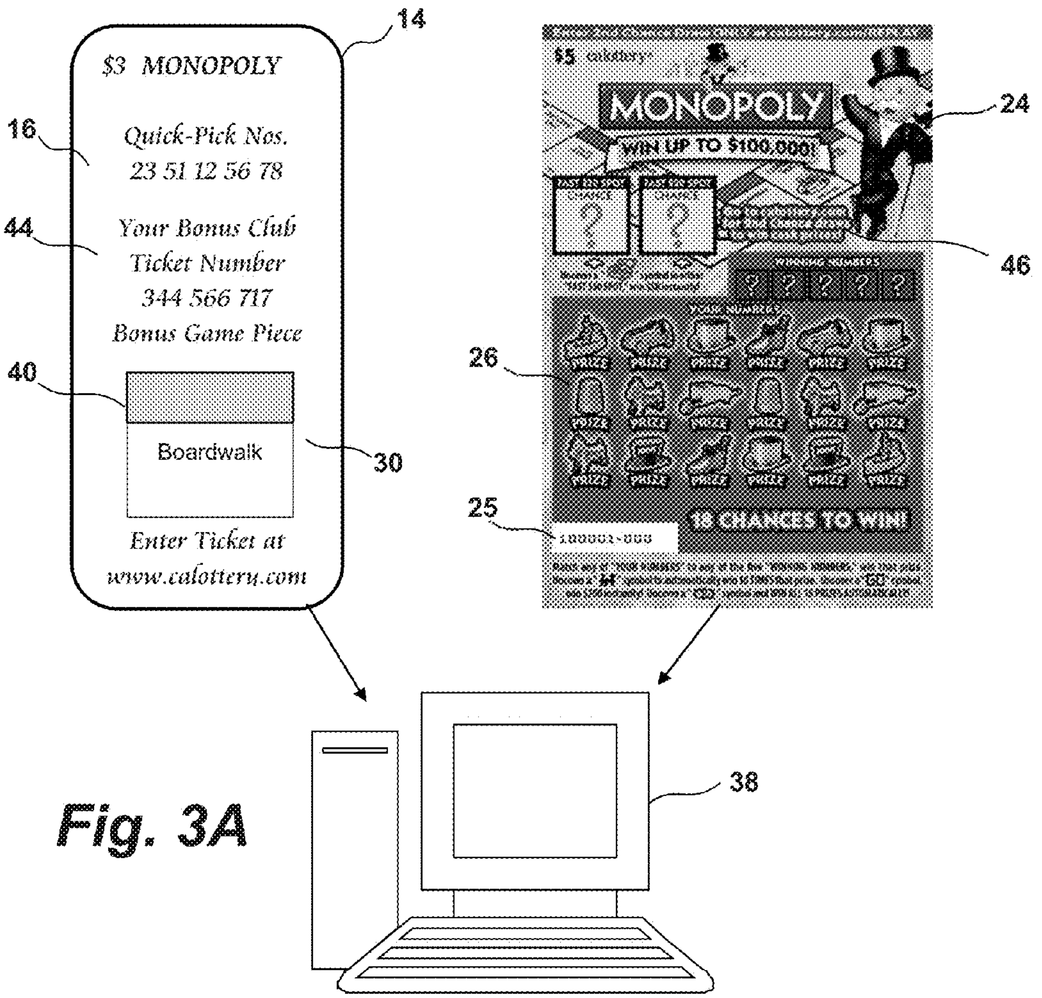
FIG. 3A is an illustration of game components, including lottery tickets and game board, that may be used in an embodiment in accordance with the invention.

FIGS. 3A through 3E relate to an embodiment of a game method and system in accordance with aspects of the invention having a particular game theme. Referring to FIG. 3A, the first game ticket 14 is embodied as a lottery ticket for a lottery draw game. The ticket 14 includes the player's draw numbers, as well as any other indicia necessary to conduct the first primary game. The ticket 14 includes indicia identifying a MONOPOLY game theme. In accordance with the game theme, the ticket 14 includes a first bonus game symbol 30 depicted as one of the real estate properties 40 from a conventional MONOPOLY board game, in this case the widely recognized "Boardwalk" property. Thus, with this embodiment, the first bonus game symbols 30 identify sets of property locations on the MONOPOLY game board. Instructions are also provided on the ticket 14 for the player to enter the ticket 14 into the bonus game 20. For example, the player is directed to access a lottery website at the web address printed on the ticket via any suitable Internet enabled device 38 (e.g., a computer, smart phone, or the like).

As mentioned above, the bonus game 20 may be administered through a players' club, wherein players establish an individual account maintained by the lottery authority for the purpose of entering, tracking, and qualifying for and playing the bonus games. The players access their account via an Internet enabled device at the website address provided on the ticket 14. Each player may have an individual account number.

Figure 3B:
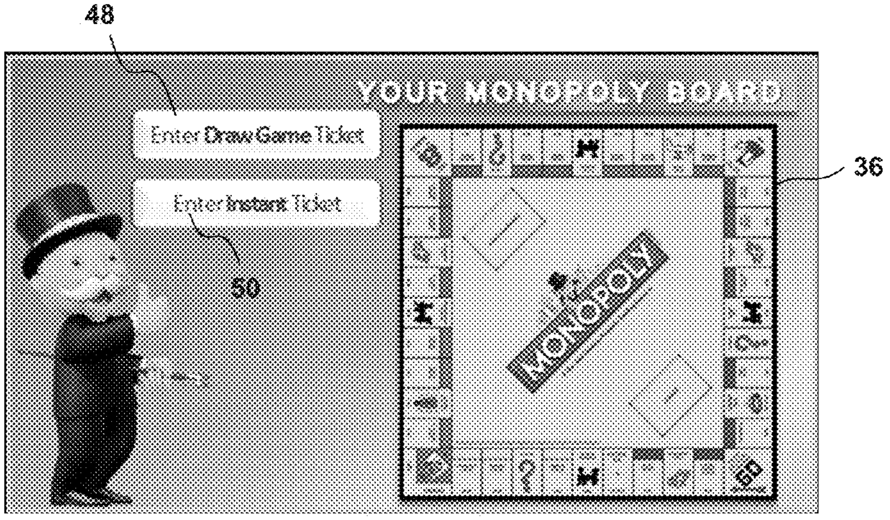
FIGS. 3B through 3E are illustrations of additional game components that may be used with the embodiment of FIG. 3A.

FIG. 3B is a screen shot illustrating entry of the first and second primary game tickets into the bonus game. At window 48, the player is instructed to enter the drawn ticket club number 44 (or other unique identifying information, such as a serial number or the like) from the ticket 14 of FIG. 3A. At window 50, the player is instructed to enter identifying information from the scratch-off ticket 24 of FIG. 3A, such as the serial number 25. A game board 36 is also provided, which is updated with first game symbols 30 and/or second game symbols 34 upon entry and verification of the respective game tickets 14, 22.

Figure 3C:
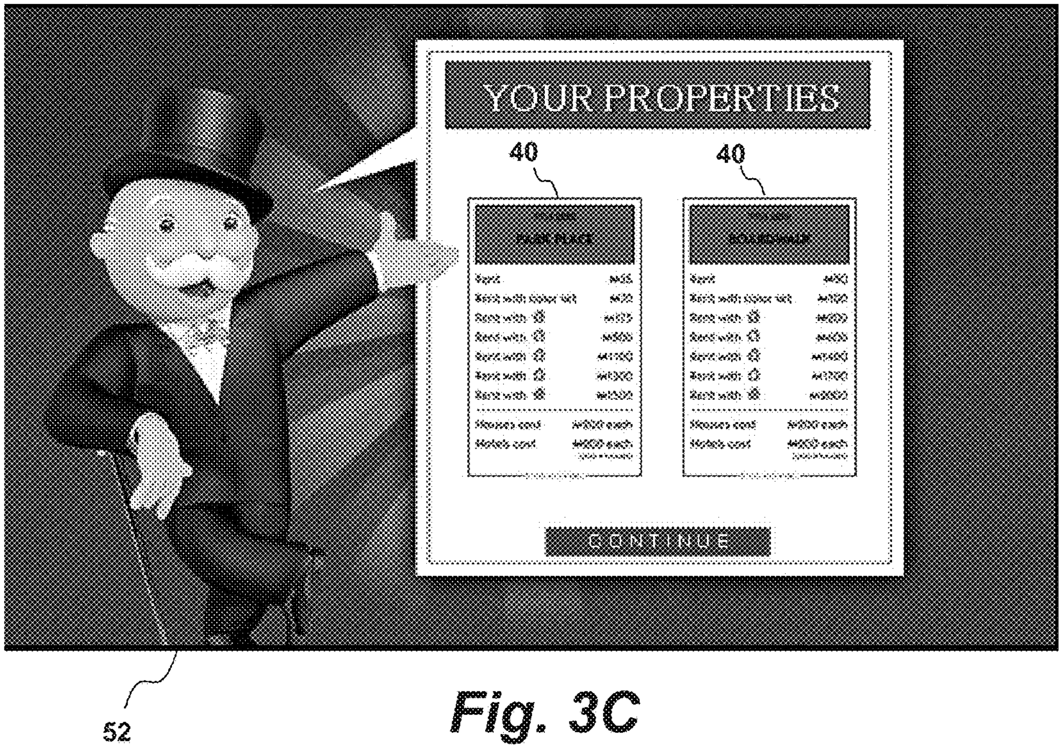

FIG. 3C is an example of a screen shot 52 provided to the player that tracks and updates the player's accumulation of first bonus game symbols. For example, the screen shot 52 informs the particular player that they have accumulated the "Park Place" and "Boardwalk" property locations.

Figure 3D:
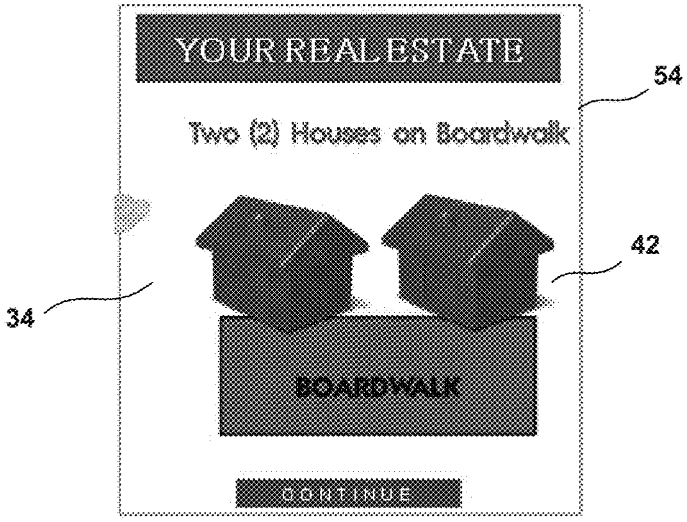

Still referring to FIG. 3A, the second game ticket 24 is embodied as an instant lottery scratch-off ticket having any manner of game indicia 26 relating to the overall MONOPOLY game theme. With this embodiment, however, the second bonus game symbol is not provided directly on the ticket 24. The player is provided instructions 46 on the ticket 24 to access the bonus game website, at which time the player will be provided the associated second bonus game symbol. For example, referring to FIG. 3D, the player may be provided a screen shot 54 identifying the second bonus game symbol 34. In the depicted embodiment, the bonus game symbol 34 is a house or hotel structure 42 built on one of the property locations on the MONOPOLY game board, such as "one hotel on Boardwalk" (as shown in FIG. 3D) or "two houses on Park Place", and so forth. As with the conventional MONOPOLY game, a greater number of house or hotel structures 42 associated with a property increases the location's value.

Figure 3E:
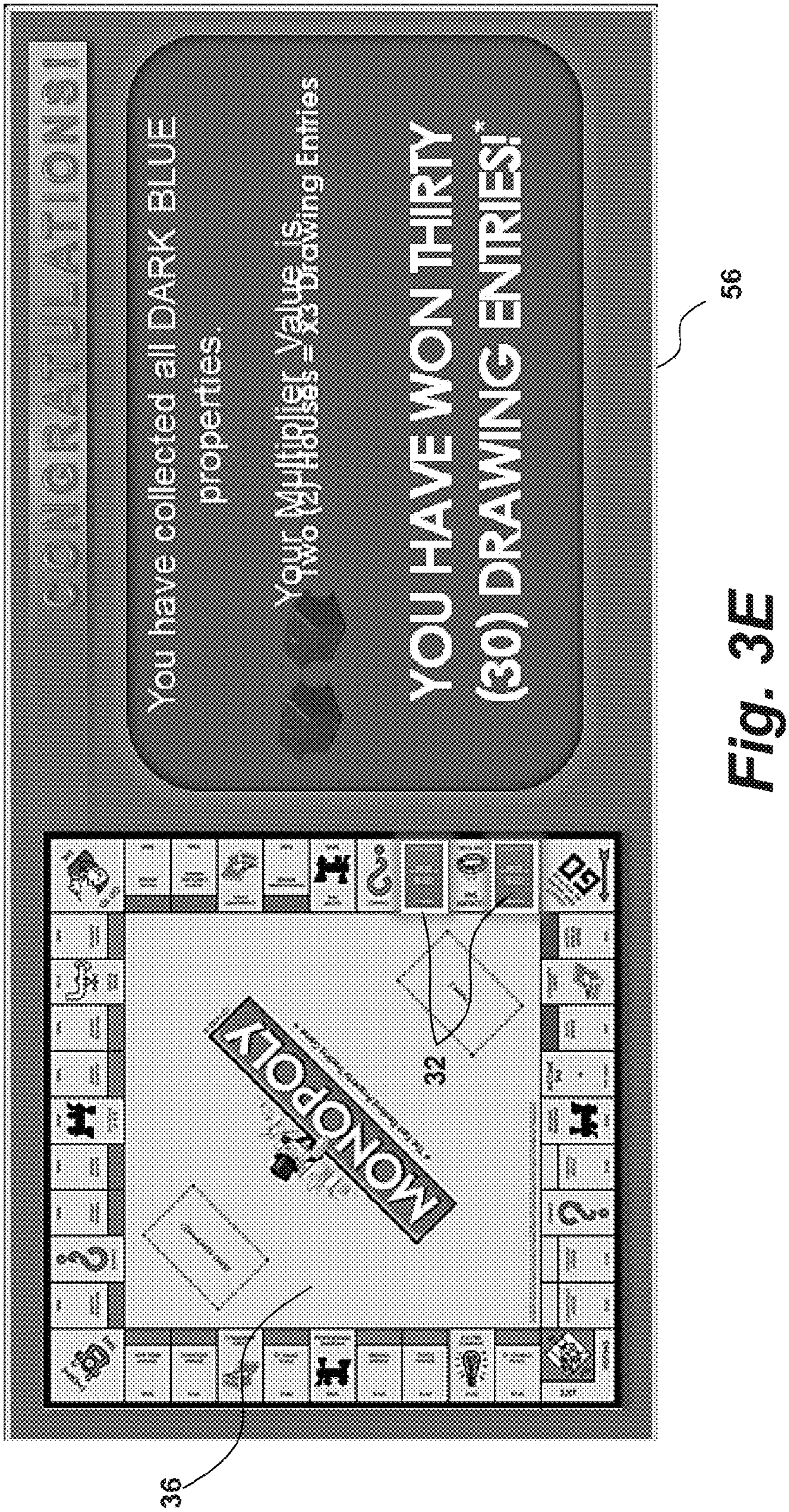

For purposes of the bonus game 20, the structures 42 increases the number of entries into the bonus game 20 when the predefined set of property locations is completed by the player. For example, the screen shot 56 of FIG. 3E depicts the bonus game board 36 as a conventional MONOPOLY game board with the player's accumulation of properties highlighted (the first bonus game symbols equating to particular property locations). The screen shot 56 also informs the player that they have satisfied on the predefined sets 32 of first bonus game symbols (e.g., all of the dark blue properties). The enhancement value provided by the second game symbol 34 (FIG. 3D) associated with the particular set 32 of game symbols is a multiplier of 3× attached to the two house structures 42. Thus, the initial award of ten entries into the bonus game for accumulating Park Place and Boardwalk from the first primary lottery game is multiplied by a factor of 3 grant the player thirty entries into the bonus game, as depicted in FIG. 3E.

Referring to the figures in general, the present invention also encompasses a game system t100 hat embodies many of the methodology aspects discussed above. The system is beneficial in that it will promote increased sales of unrelated primary games and potentially enhance winnings in a bonus or second chance game for players. For example, such a game system includes a first game entered by a purchase of a first game entry, each purchased first game entry providing a randomly assigned indicia corresponding to at least one of a plurality of indicia contained on a common game board. The first game may be a first lottery game, such as a draw game or instant ticket game, and the first game entries may be winning or non-winning tickets from the first lottery game. The game board may be a physical board, such as a substrate having a game board printed thereon, or a virtual game board provided via a website made accessible to by the players. The plurality of indicia on the common game board are divided into predefined groupings, for example groupings of playing cards by suits, colors, numbers, themes, game themes (e.g., MONOPOLY properties), and so forth. The game includes a second game entered by purchase of a second game entry that includes a prize enhancement applicable to at least one of the predefined groupings of indicia on the common game board, wherein the potential prize enhancement is awarded upon collection in the first game of all indicia in the respective predefined grouping of indicia. The second game may be a second lottery game, such as a draw game or instant ticket game.

The first and second games comprise standalone separately playable games with separate and independent prize structures, wherein the games may be played completely independent of each other.

As discussed above, the prize enhancement on the second game entries may be a game symbol that is visually linked to a particular one of the predefined groupings of indicia. Other aspects discussed above are also applicable to various embodiments of the game system. For example, the common game board may be a component of a bonus draw game wherein players are awarded a defined number of entries in the draw game once the player has accumulated the predefined grouping of indicia, the number of entries in the draw game multiplied as a function of the game symbol on the second game entry.

In a desirable embodiment, the common game board tracks indicia and game symbols accumulated by the player, including visually associating the bonus game symbols with their respective predefined groupings of indicia.

Embodiments of the methods and system disclosed herein may be executed by one or more suitable networked lottery gaming systems. Such system(s) may comprise one or more computing devices adapted to perform one or more embodiments of the methods disclosed herein. Such gaming systems and computing devices may access one or more computer-readable media that embody computer-readable instructions which, when executed by at least one computer, cause the computer(s) to implement one or more embodiments of the methods of the present subject matter. Additionally or alternatively, the computing device(s) may comprise circuitry that renders the device(s) operative to implement one or more of the methods of the present subject matter. Furthermore, components of the presently-disclosed technology may be implemented using one or more computer-readable media.

Any suitable computer-readable medium or media may be used to implement or practice the presently-disclosed subject matter, including, but not limited to, diskettes, drives, and other magnetic-based storage media, optical storage media, including disks (including CD-ROMS, DVD-ROMS, and variants thereof), flash, RAM, ROM, and other memory devices, and the like.

The present disclosure also makes reference to the transmission of communicated data over one or more communications networks. It should be appreciated that network communications can comprise sending and/or receiving information over one or more networks of various forms. For example, a network can comprise a dial-in network, a local area network (LAN), wide area network (WAN), public switched telephone network (PSTN), the Internet, intranet or other type(s) of networks. A network may comprise any number and/or combination of hard-wired, wireless, or other communication links.

Figure 4:
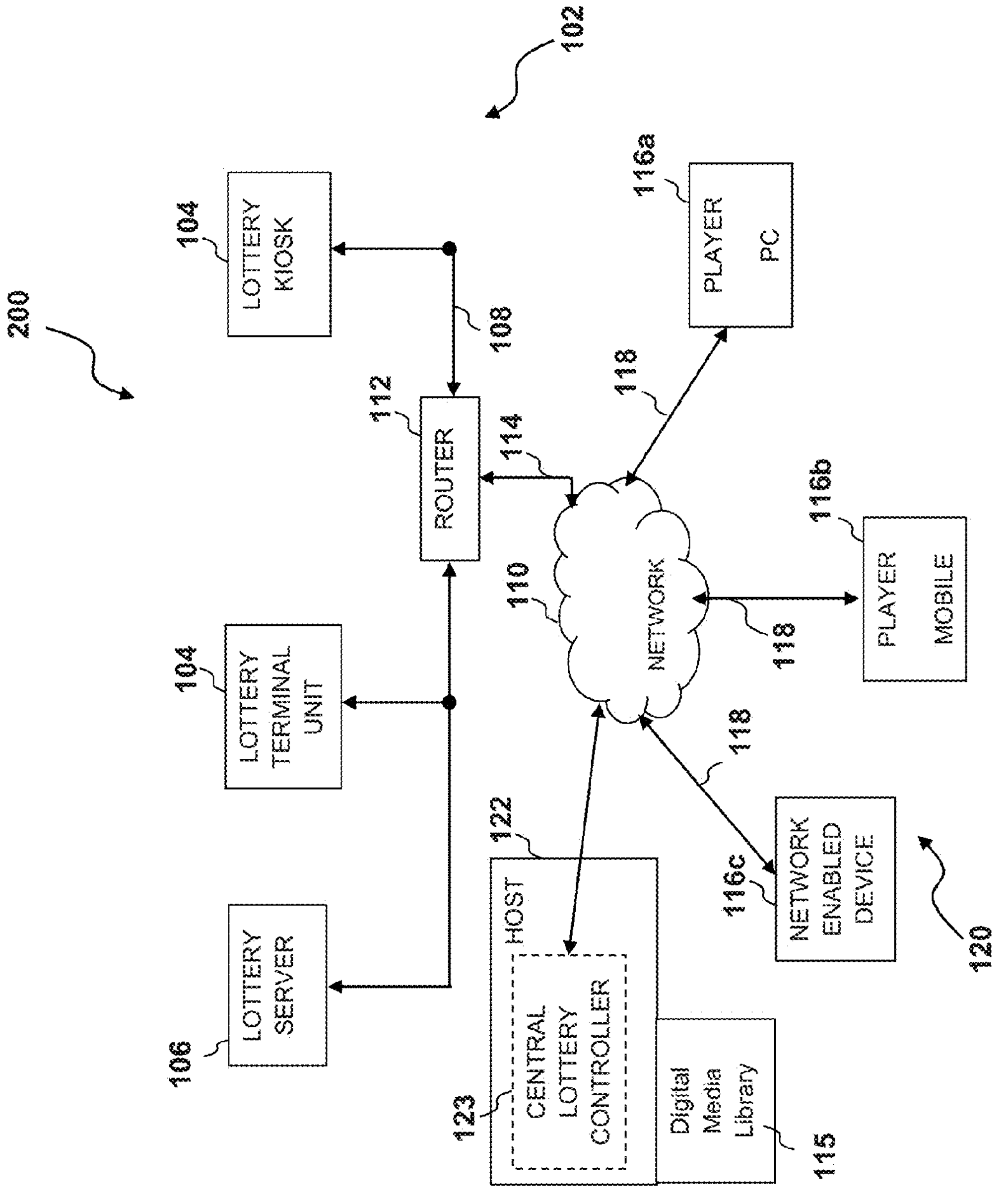
FIG. 4 is a block diagram view of a computer implemented system that may be used to practice the method and system of the present invention.

FIG. 4 is a diagram view of a representative gaming system 200 that may be used to practice aspects of the bonus game program in accordance with the present invention. The exemplary system 200 includes a central system 122 with a central controller 123 administered by a game provider that contracts with one or more lottery jurisdictions to provide lottery products and services. It should be readily appreciated that the central controller 123 may include an integrated server, or the host central system 122 may include any manner of periphery server or other hardware structure. The host computer system 122 is configured to carry out the funding and gaming functions associated with the first and second primary games and bonus game program described herein.

The host central computer system 122 may be a single networked computer, or a series of interconnected computers having access to the network 110 via a gateway or other known networking system. Generally, the central controller 123 configured to communicate with, manage, execute and control individual terminal units 104 within the lottery jurisdiction, and to interface with the network enabled devices 116*a,* 116*b,* and 116*c* of the players for entry into and play of the bonus games, as described herein. The central controller 123 may include a memory for storing gaming procedures and routines, a microprocessor (MP) for executing the stored programs, a random access memory (RAM) and an input/output (I/O) bus. These devices may be multiplexed together via a common bus, or may each be directly connected via dedicated communications lines, depending on the needs of the system 100.

The central controller 123 may be directly or indirectly connected through the I/O bus to any manner of peripheral devices such as storage devices, wireless adaptors, printers, and the like. In addition, a database (DB) may be communicatively connected to the central controller 123 and provide a data repository for the storage and correlation of information gathered from the individual terminal units 104 or devices 116. The information stored within the database may be information relating to individual players, games, or game card specific information.

Aspects of present system and method call for the players to interface with the host central computer system 122. This may be done directly, as illustrated in FIG. 4, or indirectly via the individual lottery jurisdiction servers 106. For example, the players may be provided with a website address printed on the first or second primary game tickets, whereby the player enters their game ticket into the bonus game program by accessing the central computer system 122 directly via a network enabled device 116*c* (for example, an Internet enabled PC 116*a,* or smart phone/mobile device 116*b*). Depending on the requirements of how the bonus games are actually conducted, the player may be directed to download gaming software to their PC or other network-enabled device that enables the player to perform all functions needed to participate in the second chance games. The network enabled devices 116 may be directly connected to the network 110 through a plurality of direct network links 118, thereby eliminating the need for the bus, router, or other networking equipment. The devices 116 are configured to execute one or more computer programs, such as an Internet browser program, to allow users to interact with the central computer system 122, and preferably include a visual display such as a monitor or screen. Alternatively, the visual display may be incorporated into a web-browser configured to display multimedia content. For instance, a player may access the system 122 remotely via an Internet web-browser on player device 116.

In one embodiment, the player's network enabled device may be located at a point of sale location for the first or second primary game lottery tickets, and may even be a part of the terminals 104. In this embodiment, a player may interact with the system 122 immediately after purchasing or receiving a primary game ticket.

Each lottery jurisdiction may be differently configured for purposes of carrying out various lottery functions within its borders. For purposes of discussion, each lottery jurisdiction may be considered as a node. The lottery jurisdiction nodes 120, in turn, may be directly connected and/or multiplexed to the network 110 via direct network links. Further, the direct network links may be secure communications channels physically hardened against tampering and/or the communications may be encrypted to prevent unauthorized access to information transmitted thereon.

With each lottery jurisdiction, a plurality of terminal units 104 may be provided at multiple locations and connected with a LAN or WAN. Further, the LAN and/or WAN connecting each of the terminal units 104 may include one or more separate and secure buses 108, routers 112, web servers 106, gateways and other networking equipment to provide continuous and/or redundant connectivity to the network 110. As discussed above, the network 110 may be communicatively connected to central host computers 122 and/or respective central controllers as well as associated databases to allow for implementation, storage, tracking and analysis of gaming and other features. The network 110 may also be connected to external systems (e.g., Facebook™, Twitter™, etc.) for different purposes. For example, the players may be notified through these external systems as to whether or not they won or lost in the primary or second chance games.

The terminal units 104 may be configured with any manner of hardware and software functionality to accept a player's entry and wager into a primary game, such as an on-line game or purchase of an instant game ticket. The terminal units 104 may also be configured for redeeming a player's game ticket after completion of the primary game, or completion of the second chance game of the player's choice. For example, the terminals may issue a credit slip that the player uses to collect their prize award at an establishment's cashier or an authorized lottery redemption center.

The terminals 104 may include any conventional feature known to those skilled in the art related to lottery terminals. The terminal 14 includes features and functionality to allow a player or retail clerk to enter the information required to participate in the lottery game. An exemplary terminal 14 includes a housing, one or more input devices, which may be a control panel having input keys, a display, a value input device such as a card reader, a play slip or ticket reader, and a ticket printer. The play slip reader is typically configured to read user selection marks, bar codes, magnetically stored information, or any other desired input information. Control panel input keys allow the player or retail clerk to select the game to be played, input the value to be wagered, manually enter selected lottery characters, and input any other information necessary to play the lottery game. The terminal may include a display which may be an LCD, a CRT, or touch-screen capable of receiving and displaying information related to the game. The value input device may include any device that can accept value or a wager from a customer, such as a card reader or an optical currency collector. The value input device may be integrated with external devices, such as a cash register or other retail terminals, to exchange information necessary to receive and record the wagering transaction. The game ticket printer may be used to print or otherwise encode game tickets with information selected or required to play the lottery game. The printer may provide game tickets that reflect a player's selection, or complete lottery slips if the selection was generated automatically by the terminal. It should be readily appreciated that particular embodiments of terminals 14 are not meant as a limitation of the invention, and that embodiments of the present invention may encompass any configuration of features and functionality to allow initiation and playing of a lottery game.

It should be appreciated by those skilled in the art that various modifications and variations may be made present invention without departing from the scope and spirit of the invention. It is intended that the present invention include such modifications and variations as come within the scope of the appended claims.

What is claimed is:

1. A method for conducting a bonus game to a first primary lottery game that enhances sales of tickets in a second primary lottery game, wherein the first primary lottery game is conducted using first game tickets and an associated first prize structure and the second primary lottery game is conducted using second game tickets and an associated second prize structure, wherein the first game tickets and the second game tickets are purchasable physical lottery game tickets, the method comprising:

establishing, by one or more processors, the first primary lottery game wherein players of the first primary lottery game are issued the first game tickets for play of the first primary lottery game;

establishing, by the one or more processors, a bonus game for the first primary lottery game that is played separate from the first primary lottery game, wherein, the players of the first primary lottery game enter at least one first game ticket of the first game tickets from the first primary lottery game to qualify for an entry in the bonus game by providing a first unique identification code printed on the at least one first game ticket;

establishing, by the one or more processors, the second primary lottery game wherein players in the second primary lottery game are issued the second game tickets for play of the second primary lottery game;

configuring the second game tickets to be used in the bonus game such that a prize awarded in the bonus game to the players of the first primary lottery game that have entered the least at one first game ticket is enhanced by the players of the first primary lottery game also becoming players in the second primary lottery game and entering at least one second game ticket of the second game tickets into the bonus game by providing a second unique identification code printed on the at least one second game ticket;

wherein play of the first primary lottery game does not require play of the bonus game or the second primary lottery game, play of the second primary lottery game does not require play of the first primary lottery game or the bonus game, and play of the bonus game requires play of the first primary lottery game but not the second primary lottery game;

wherein the first game tickets and the second game tickets are further configured to be used in the bonus game by:

printing one of a plurality of different first bonus game symbols on each of the first game tickets, wherein the players of the first primary lottery game are required to collect one of a plurality of predefined sets of one or more of the first bonus game symbols to qualify for the entry in the bonus game;

printing a second bonus game symbol on each of the second game tickets that visually associates the second game ticket to one of the predefined sets of first bonus game symbols;

wherein the prize awarded in the bonus game is enhanced only if the player of the first primary lottery game also enters in the bonus game one of the second game tickets having the second bonus game symbol associated with the predefined set of first bonus game symbols entered in the bonus game; and wherein the first unique identification code and the second unique identification code are provided electronically through a communications network to a remote computing device hosting the bonus game.

2. The method as in claim 1, wherein the bonus game is a draw game and the player of the first primary lottery game is awarded a defined number of entries in the draw game upon entry into the bonus game, the number of entries being multiplied as a function of the second bonus game symbol on the second game ticket entered by the player in the bonus game.

3. The method as in claim 2, wherein the bonus game is conducted on a scheduled periodic basis such that the players of the first primary lottery game become eligible for a next scheduled bonus game upon acquiring the predefined set of first bonus game symbols.

4. The method as in claim 1, further comprising providing the players of the first primary lottery game with a bonus game board configured to aid in tracking the first bonus game symbols and second bonus game symbols collected by the players, including visually associating on the game board the second bonus game symbols with their respective predefined set of first bonus game symbols.

5. The method as in claim 4, wherein the bonus game board has a MONOPOLY game theme, the first bonus game symbols identifying sets of property locations on the MONOPOLY game board and the second bonus game symbols equating to house or hotel structures built on the property locations, wherein a greater number of house or hotel structures associated with the property locations increases enhancement of the prize awarded in the bonus game.

6. The method as in claim 5, wherein the bonus game board is an individual virtual game board provided to each of the players of the first primary lottery game via a website.

7. The method as in claim 6, further comprising establishing individual player accounts that are accessible by the players of the first primary lottery game via the website, the accounts including the player's individual virtual game board updated with a status of the first bonus game symbols and the second bonus game symbols collected by the player.

8. The method as in claim 1, wherein the first primary lottery game is a lottery draw game and the first game tickets provide at least one entry into the lottery draw game.

9. The method as in claim 8, wherein the second primary lottery game is an instant ticket lottery game and the second game tickets having the second bonus game symbol provided thereon.

10. The method as in claim 9, wherein the bonus game is a draw game and the player of the first primary lottery game is awarded a defined number of entries in the draw game upon entry of the first game ticket into the bonus game, the number of entries being multiplied as a function of the second bonus game symbol on the second game ticket entered by the player in the bonus game.

* * * * *